United States Patent [19]
Kjos et al.

[11] 3,825,203
[45] July 23, 1974

[54] PNEUMATICALLY CONTROLLED BISTABLE REEL HUB MECHANISM

[75] Inventors: Kagne Jarle Kjos, Thousand Oaks; Johan Henri Molleman, Newsbury Park, both of Calif.

[73] Assignee: Burroughs Corporation, Detroit, Mich.

[22] Filed: Sept. 20, 1972

[21] Appl. No.: 290,768

[52] U.S. Cl. .............................................. 242/68.3
[51] Int. Cl. ............................................ B65h 19/02
[58] Field of Search .......... 242/68.1, 68.2, 68.3, 72, 242/72.1, 46.2, 46.4, 210

[56] References Cited

UNITED STATES PATENTS

| | | | |
|---|---|---|---|
| 3,310,253 | 3/1967 | Rayfield et al. | 242/68.3 |
| 3,645,464 | 2/1972 | Herger et al. | 242/68.3 |
| 3,690,581 | 9/1972 | Wainio | 242/68.3 |
| 3,708,136 | 1/1973 | Cope et al. | 242/68.3 |

FOREIGN PATENTS OR APPLICATIONS

| | | | |
|---|---|---|---|
| 984,341 | 2/1965 | Great Britain | 242/68.3 |

*Primary Examiner*—John W. Huckert
*Assistant Examiner*—John M. Jillions
*Attorney, Agent, or Firm*—Charles S. Hall; Edward G. Fiorito; Paul W. Fish

[57] ABSTRACT

A bistable, pneumatically controlled hub, with a manual override, for locking a properly positioned reel on the hub by means of the expansion of a resilient ring channeled in the hub. The hub has an inner air chamber, including a reciprocable wall actuated by positive and negative air pressure supplied through the hub drive shaft and an auxiliary air chamber. Apertures in the auxiliary chamber are sealed only by the proper positioning of the reel on the hub permitting the reciprocable wall to pivot an over-center device for alternately exerting and releasing pressure on portions of the inner circumference of the resilient ring, and thereby on the inner bore of the reel.

10 Claims, 4 Drawing Figures

PNEUMATICALLY CONTROLLED BISTABLE REEL HUB MECHANISM

BACKGROUND OF THE INVENTION

This invention is an improvement on apparatus for locking a reel to a rotatable hub only when the reel is properly aligned on the hub.

Magnetic tapes are a common means of data input to modern high speed computer equipment. It is essential that the tape reel be properly aligned on the hub of the reel drive shaft and locked in position in order for data on the tape to be read by the machine. An improperly aligned reel can interfere with, or prevent, tape feeding, and a reel not locked on the hub may fly off at high speed. It is a constant object in the improvement of reel hubs for computer equipment, therefore, to minimize human error by making safeguards against such errors automatic.

Various devices have been developed for locking a reel to a hub by expanding a resilient ring channeled in the hub against the inner surface of the bore of the reel. A pneumatically actuated reel hub mechanism is taught in U.S. Pat. No. 3,310,523 to Rayfield et al, of common ownership herewith, wherein the reel is automatically locked on the hub by attracting a pressure plate under constant vacuum against a side of the resilient ring and expanding the ring outwardly, only when the properly aligned reel seals apertures in the vacuum supply.

Since the same magnetic tape is often used continuously for extended periods of time it is economically desirable to be able to release the air pressure after the reel is locked in proper position and have the reel remain locked until positively released. Such an improvement would offer protection also in case of failure of the air supply.

Bistable apparatus is known for locking a reel on a rotatable hub by expanding at least portions of a resilient ring on the hub outwardly against the bore of the reel by over-center devices actuated manually in the operation of mounting the reel on the hub. However, it has not been known how to incorporate bistable devices in a pneumatically actuated locking hub providing positive automatic control for both locking and release of the reel, the device being inoperable unless the reel is properly aligned on the hub.

SUMMARY OF THE INVENTION

The problems outlined above have been overcome in a pneumatically actuated reel hub locking mechanism by incorporating within the hub an air chamber having a reciprocable wall actuated by positive and negative air pressure, supplied through an auxiliary air chamber and the drive shaft for rotating the hub. Apertures in the auxiliary air chamber are sealed only by the proper alignment of the reel on the hub. The reciprocable wall drives over-center devices for exerting and releasing pressure against portions of the inner circumference of a resilient ring channeled in the outer circumference of the hub, and thereby against the bore of the reel, for automatically locking and unlocking the reel. Means are provided for manually overriding the pneumatic control.

The disclosure of this invention and the manner in which it achieves the above and other objects will be more clearly understood by reference to the following detailed description when considered with the drawing in which.

DETAILED DESCRIPTION OF THE PREFERRED EMBODIMENT

Figure 4:
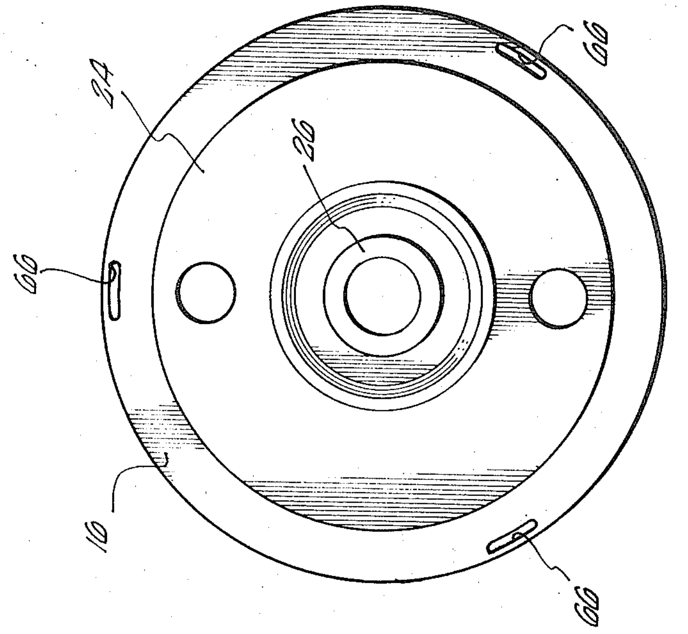
FIG. 4 is a vertical section of the reel hub of the invention taken along the lines 4 — 4 of FIG. 2.
Figure 1:
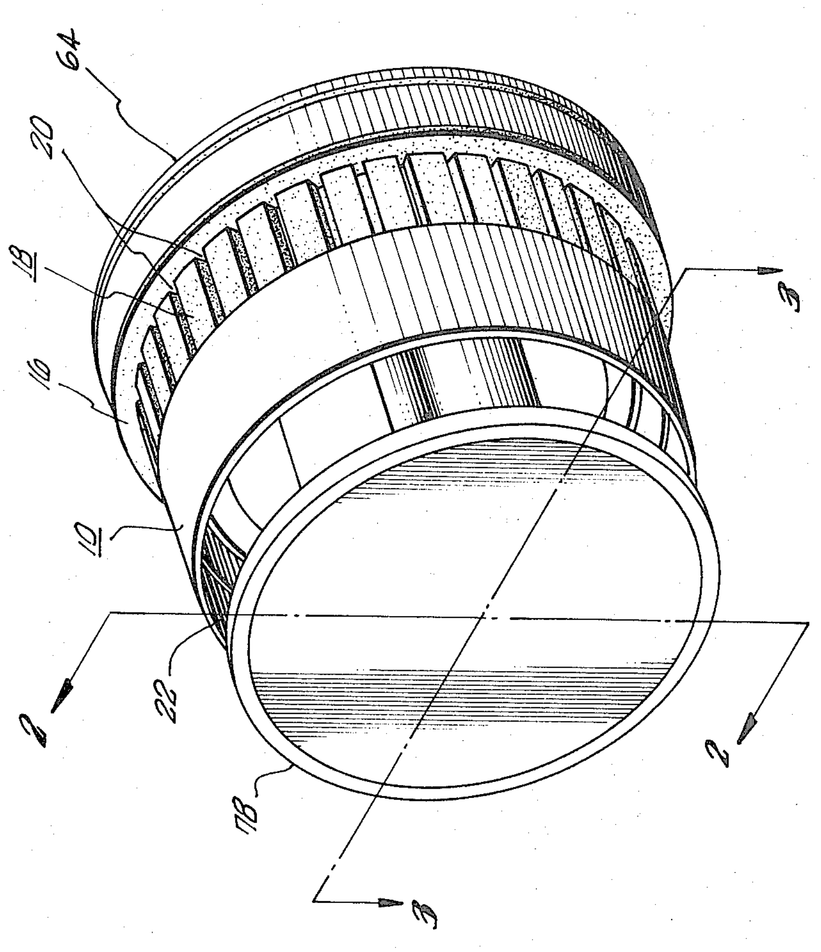
FIG. 1 is a perspective view of the reel hub of the invention.

The locking reel hub of the invention includes a cylindrical shell 10 over which the bore 12 of a conventional reel 14 (shown in phantom lines in FIGS. 2 and 3) is slid into position against a shoulder 16. Channeled in the shell 10 and forming part of its curved surface is a resilient ring 18 which may have one or more grooves or recesses 20, for example, in the surface thereof for increased traction on the bore 12 of the tape reel 14. As will be explained more fully hereinafter, certain portions of the resilient ring 18 are expanded outwardly from the shell 10 against the bore 12 of the reel 14 for locking the reel to the hub.

The cylindrical shell 10 has an open outer end 22 over which the reel 14 is guided in mounting the reel on the hub. The inner end of the shell 10 is closed by a wall 24 having an outwardly extending portion forming shoulder 16. Integral with, and substantially perpendicular to, the circular wall 24 is an inner cylinder 26 extending outwardly toward the open end of the shell 10 into which a hollow drive shaft 28 is inserted for rotating the shell 10 when the reel 14 is properly positioned thereon. The shell 10 is rigidly affixed to the drive shaft 28, as by pins 30, through the walls of inner cylinder 26 into the walls of hollow drive shaft 28.

Journaled on the inner cylinder 25, for sliding, reciprocating motion, is a cup-shaped actuator 32 with a sleeve portion 34 extending rearwardly toward the wall 24. A cut-out portion or slot 36 in the wall 24 may form a home position for the actuator 32, the end of sleeve 34 fitting into the slot 36.

Internal support for the shell 10 may be provided by an apertured transverse wall 38 (FIG. 2) rigidly attached to the inner surface of theshell and journaled around the actuator 32. The transverse wall 38 may join the cylindrical shell 10, for example, near the outer edge of the resilient ring 18. Further support and stabilization of the assembly is provided by a lateral frame member 40 between the transverse wall 38 and the rear wall 24 of the cylindrical shell 10. A lip seal 42 gives sliding and airtight contact between the transverse wall 38 and the sleeve portion 34 of actuator 32.

A piston 44 rigidly affixed to the actuator 32 has sliding contact with the curved inner surface 46 of the cylinder shell 10. Resilient fingers 48 form skirts between the periphery of the piston 44 and the inner cylindrical surface 46 to provide an airtight, lipseal, sliding contact between the piston 44 and the shell 10.

A main air chamber 50 is contained within the bounds of the piston 44, the actuator 32, the inner surface of rear wall 24, and the inside surface of shell 10. Since the piston 44 is rigidly attached to the actuator 32, and the actuator in turn is journaled on the inner cylinder 26, any movement of the piston advances or retracts the actuator 32.

An auxiliary air chamber 52 is bounded by the rear wall 24, the inside surface of rear wall assembly 54, and a short, outer section of hollow drive shaft 28. The rear wall assembly 54 of the auxiliary air chamber 52 is also the rear wall of the hub assembly and rigidly encases the drive shaft 28 to rotate therewith.

Figure 2:
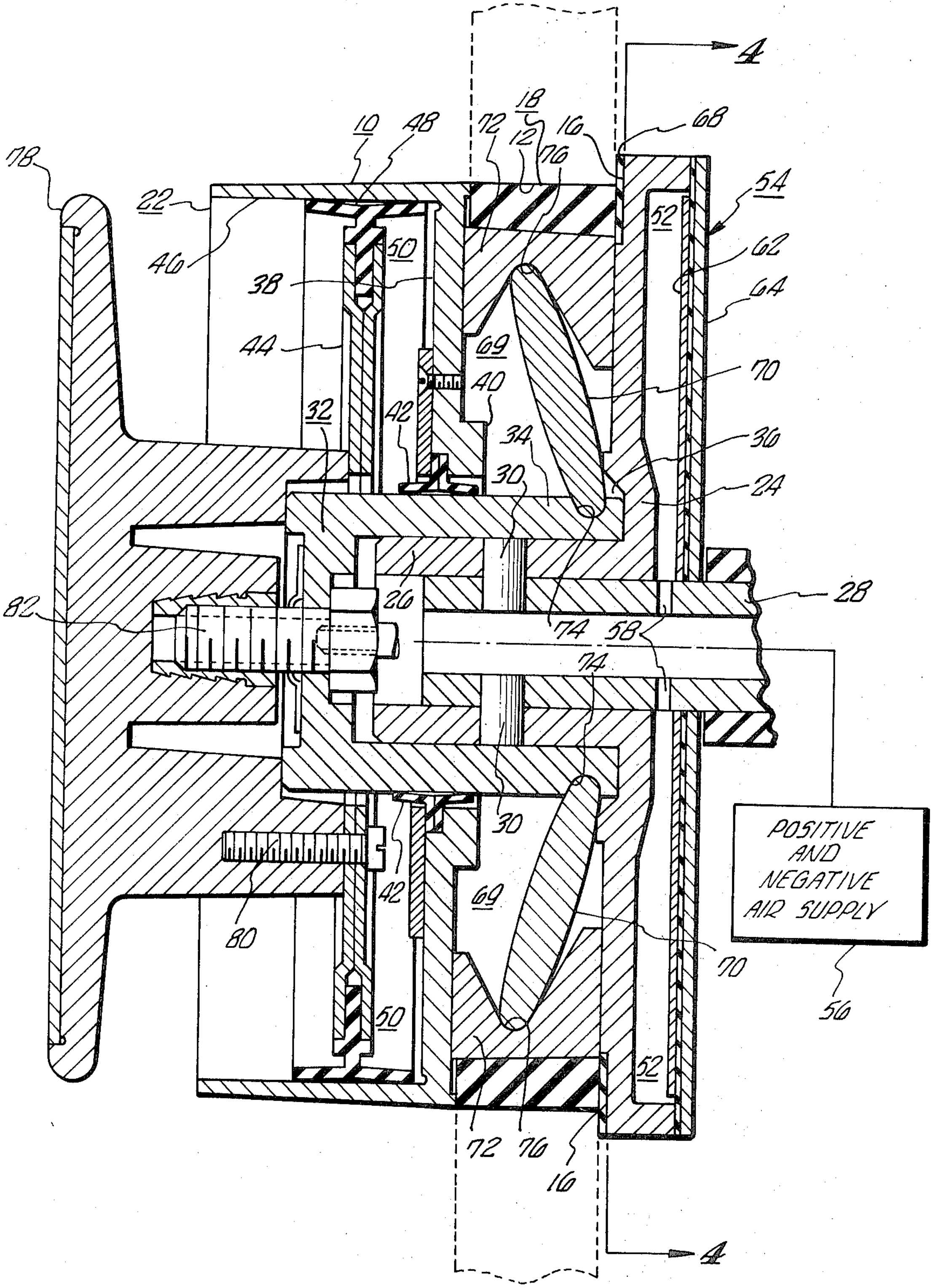
FIG. 2 is a cross section of the reel hub of the invention taken along the lines 2 — 2 of FIG. 1.
Figure 3:
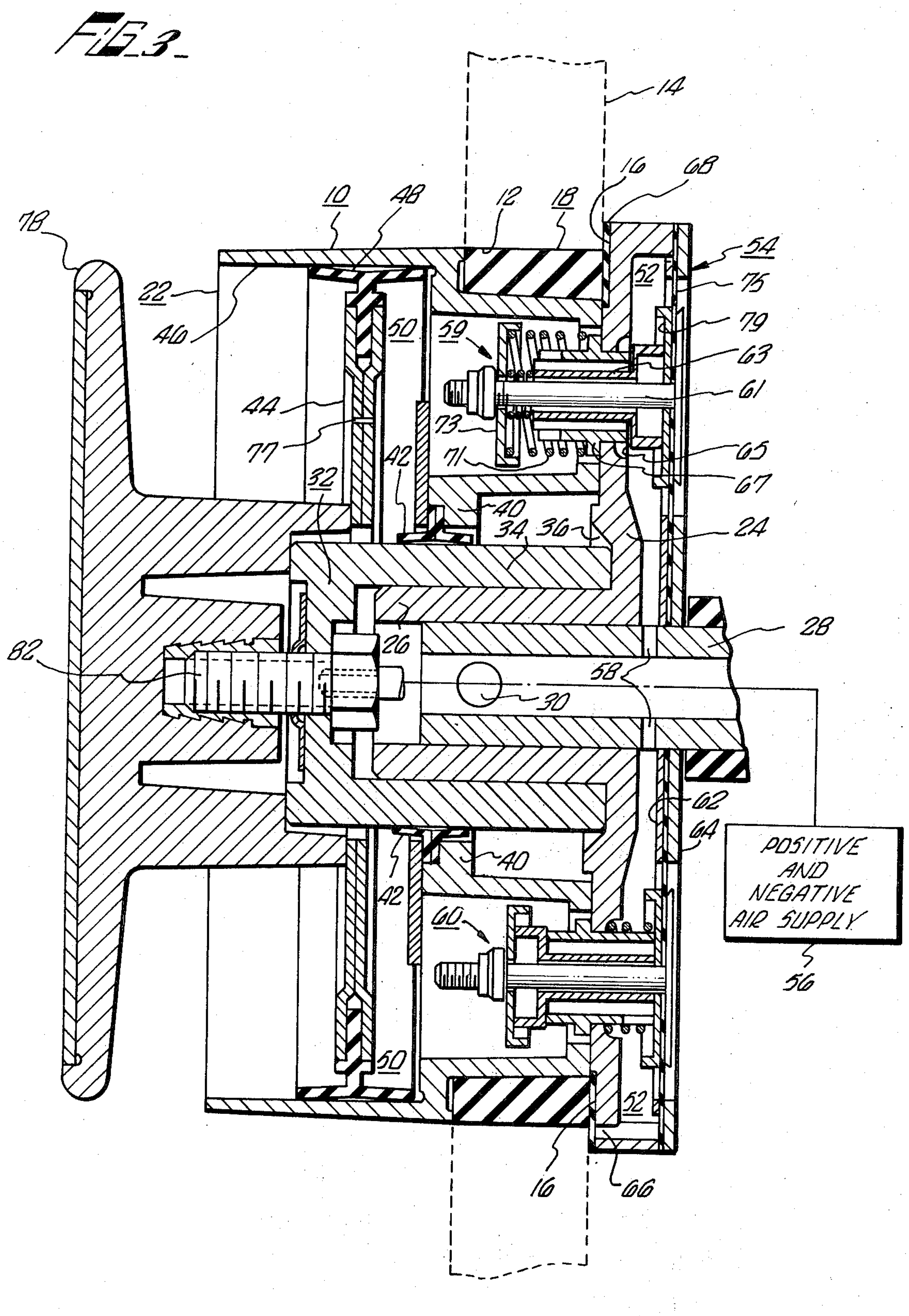
FIG. 3 is a cross section of the reel hub of the invention taken along the lines 3 — 3 of FIG. 1.

The central passage of hollow drive shaft 28 is interconnected with a positive and negative air supply 56 shown in block form on FIGS. 2 and 3. The inside end of hollow drive shaft 28 is pneumatically sealed and the apertures 58 in the hollow shaft provide access to the auxiliary air chamber 52.

In the preferred embodiment, a positive pneumatic pressure sensitive valve 59 and a negative pneumatic pressure sensitive valve 60 are mounted within openings in the wall 24 to interconnect the auxiliary air chamber 52 with main air chamber 50, as illustrated in FIG. 3. The positive pneumatic pressure sensitive valve 59 includes a central shaft 61 with a circular disk attached at one end and a threaded portion at the opposite end. Surrounding cenral shaft 61 is a first hollow sleeve 63 of plastic material with an enlarged portion forming a shoulder 65. Surrounding the first hollow sleeve 63 is a second hollow sleeve 67 of plastic material securely mounted within the opening in wall 24. The inside of the second hollow sleeve 57 engages the shoulder portion 65 of the first hollow sleeve to form the valve faces. A coil spring 71 surrounds the second hollow sleeve 67 and is held in place between a cap washer 73 with nut on the threaded end of shaft 61 and a central protruding portion of the second hollow sleeve. The expansion force of spring 71 holds the valve faces closed, thereby sealing the end of the second hollow sleeve 67 with the shoulder portion 64. An air space exists between the walls of the first and second hollow sleeves.

The positive pressure valve 59 cooperates with the rear wall assembly 54 of the auxiliary air chamber. The rear wall assembly 54 includes an outer circular plate 64 and an inner circular plate 62 of slightly smaller diameter than the diameter of the outer circular plate. Located between these two plates is a thin rubber-like gasket 75. A hole appears in each of the two circular plates at the position surrounding the circular disk attached at one end of shaft 61, as shown. The enlarged end of the first hollow sleeve 63 contacts a cap wahser 79 surrounding shaft 61. The outer flat surface of this cap washer presses against the thin gasket 75.

Positive pressure valve 59 opens when the air pressure within the auxiliary air chamber 52 applies sufficient force against the inside surface of cap washer 79 to overcome the force of spring 71 thereby compressing the spring by the outward expansion of cap washer 79 against the circular disk. This force causes the opening of the passage way between the valve faces. Air from auxiliary air chamber 52 then enters through the valve faces into the passage way and into the main air chamber 50.

Negative pressure valve 60 is similar in part to the positive valve 59 with the exceptions that the ends of the first and second hollow sleeves are reversed so that the valve faces appear within the main air chamber 50 instead of the auxiliary air chamber 52 and the coil spring is located within the auxiliary air chamber 52. Circular holes appear in both of the circular plates 62 and 64 surrounding the circular disk portion of the negative pressure valve 60, in the same general manner as with positive pressure valve 59.

The rear wall assembly 54 is held together by means of machine screws (not shown) which extend from outer circular plate 64 through openings in gasket 75 and openings in inner circular plate 62 into rear wall 24. The outer surfaces of gasket 75 seal the outer circular plate 64 to the rim portion of rear wall 24 to close the auxiliary air chamber 52.

Three elongated apertures 66, as illustrated in FIG. 4, are equally spaced around the shoulder portion 16 of the rear wall 24 and extend through rear wall 24 into the auxiliary air chamber 52. One of these apertures appears in the lower portion of the sectional view of FIG. 3.

Overlying the three apertures 66 and contiguous with the flat face of shoulder 16 is a thin, flat, resilient annular disk or washer 68 illustrated in FIGS. 2 and 3. The resilient washer 68 is held in place against the face of shoulder 16 by the resilient ring 18. Resilient washer 68 serves the function of sealing or closing the three apertures 66 only when a reel is placed upon the resilient ring and pressed uniformly against the washer 68 at each of the three positions overlying the three apertures 66.

Positive air pressure applied from supply 56 enters the hollow shaft 28 and passes through apertures 58 into the auxiliary air chamber 52. If the three elongated apertures 66 are not tightly closed or sealed by resilient washer 68, air will escape through these apertures 66 into the ambient atmosphere. Accordingly, the present invention assures the proper positioning and alignment of a reel 14 upon the reel locking hub by the sealing of all three apertures 66 only when the reel is correctly held in position. When this correct positioning is achieved, air pressure will build up within auxiliary air chamber 52. If only two of the apertures 66 are sealed, leaving one aperture open to the ambient atmosphere, air pressure will not build up with auxiliary air chamber 52. Automatic locking of a reel 14 in place upon the resilient ring 18 of the hub mechanism will occur only upon the build up of sufficient air pressure within auxilary air chamber 52 to cause the opening of positive air pressure valve 59.

Opening of air pressure valve 59 enables air under pressure in auxiliary air chamber 52 to enter main air chamber 50. As the air pressure builds up within main chamber 50, piston 44 is forced to move outwardly toward the open end 22 of hub shell 10. Since piston 44 is rigidly attached to actuator 32, the actuator with its sleeve portion 34 will, accordingly, slide over inner cylinder 26 toward the open end 22 of hub shell 10. Actuator 32, which may be constructed from a smooth and durable plastic material, slides through the circular lip seal 42, thereby permitting main air chamber 50 to expand in volume without the leakage of air.

The space between the outer surface of the sleeve portion 34 of actuator 32 and the resilient ring 18 contains at least two, and preferably four, open-ended radially extending cavities 69 of square or rectangular cross section. Located within each of these cavities is an interposer or push rod 70 which extend between notches 74 on the outer surface of the sleeve portion 34 and the convex inner surface 76 of the shoes 72. The shoes 72 are of square or rectangular cross section in order to slideably fit within radial cavities 69. The outer surfaces of shoes 72 engage the inner surface of the resilient ring 18. FIG. 2 illustrates, in section, two of the interposers 70 and shoes 72. The radially extending cavities 69 lie within the cylindrical shell 10 bounded on one side by the wall 38 and on the opposite side by rear wall 24. The cavities 69 are not a part of main air chamber 50, and the shoes 72 are adapted to freely move in a radial direction within these cavities.

The interposers 70 are pivoted between the notches 74 in actuator 32 and their respective shoes 72 by any convenient over-center means so as to be bi-stable. Accordingly, the actuator 32, interposers 70, and shoes 72 function in a manner similar to the well-known toggle mechanism.

The sliding outward movement of actuator 32 caused by increasing air pressure in the main air chamber 50 results in a change of position of interposers 70 through their over-center position into a stable but more upright position than that shown in FIG. 2. This new stable position causes the interposers 70 to exert a radially extending force upon the shoes 72 resulting in pressure being applied to the inner surface of the resilient ring 18. This pressure will expand the resilient ring 18 tightly against the bore 12 of reel 14 firmly locking the reel in its proper position.

After the reel 14 is firmly locked in position, the positive air pressure may be released. After this has been done, the air pressure within main air chamber 50 will slowly decrease until atmospheric pressure is reached. To aid this slow reduction in air pressure, a tiny bleeder hole 77 is located through the piston 44, as illustrated in FIG. 3. The size of this hole 77 is small enough so as not to adversely affect the operation of piston 44, and actuator 32 during the locking cycle.

When it is desired to release reel 14, negative air pressue from supply 56 operates to reduce the air pressure within the auxiliary air chamber 52 to a level that will cause the negative pneumatic pressure sensitive valve 60 to open. When valve 60 opens, air pressure in main air chamber 50 is reduced thereby causing piston 44 and actuator 32 to retract to the original position shown in FIGS. 2 and 3. Interposers 70 are thereby returned to their original stable position releasing the pressure upon shoes 72 and the resilient ring 18. Reel 14 is released and may be manually removed from the hub.

The preferred operation of the positive and negative pressure sensitive valves 59 and 60 is such that they require a predetermined build up of pressure or of vacuum in the auxiliary air chambers 52 before these valves open. In this case, when these valves do open, the change in air pressure in the main air chamber 50 occurs abruptly thereby causing the piston 44 and actuator 32 to move quickly. This motion of actuator 32 produces a snap like action on the interposers 70 to positively lock or to unlock reel 14.

Manual operation of the reel locking hub may be carried out by means of the knob 78 which is attached to piston 44 and actuator 32 by screws 80 and 82 without any dependence upon the positive and negative air supply 56. Additionally, the reel locking hub may be operated to achieve atuomatic locking through the use of only a positive air supply and a single positive air pressure valve while relying solely upon manual control for unlocking the reel. In this latter case, the negative air pressure valve 60 is not required and may be removed.

By applying sufficient force to knob 78, it is possible for an operator to manually over-power or override the pneumatic operation of the piston 44 and actuator 32, if desired.

It is also apparent that the reel locking hub may be operated automatically to properly lock a reel in place without reliance upon the two air pressure valves. With the reel placed and held in proper position upon the hub, thereby closing the elongated apertures 66, positive air pressure from supply 56 may be applied directly to the main air chamber 50. In this case, air pressure will build up within air chamber 50 causing piston 44 to be driven outwardly until the interposers 70 are actuated to lock the reel in place. Conversely, the application of negative air pressure from supply 56 will result in a reduction of air pressure within main air chamber 50, thereby retracting piston 44 and actuator 32 to release interposers 77 and unlock the reel 14.

Since it is apparent that many changes could be made in the above construction and many widely different embodiments of the invention could be made without departing from the scope thereof, it is intended that all matter contained in the above description or shown in the accompanying drawings shall be interpreted as illustrative and not in a limiting sense.

What is claimed is:

1. A pneumatically controlled hub for a reel comprising:
   - rotatable, cylindrical, shell means for slidably receiving said reel about its periphery;
   - means for sensing the proper positioning of said reel on said shell means;
   - resilient means circumferentially positioned on said shell means for locking said reel to said shell means when at least a portion of said resilient means is expanded outwardly from saie shell means;
   - bistable means having an operating position and a rest position for expanding at least a portion of said resilient means outwardly from said shell means at said operating position, said bistable means being independently stable at said operating position and said rest position; and
   - pneumatic means responsive to said sensing means for shifting said bistable means between said rest and operating positions 2. The pneumatically controlled hub of claim 1 wherein said pneumatic means includes:
   - a main air chamber within said cylindrical shell means including piston means engaging the inner surface thereof;
   - valve means accessing said air chamber; and
   - means for supplying pneumatic actuation to said valve means.

3. The pneumatically controlled hub of claim 2 wherein said means for supplying pneumatic actuation to said valve means includes means for applying positive air pressure for shifting said bistable means from said rest position to said operating position.

4. The pneumatically controlled hub of claim 2 wherein said means for supplying pneumatic actuation to said valve means includes means for applying negative air pressure for shifting said bistable means from said operating position to said rest position.

5. The pneumatically controlled hub of claim 1 also including manual means for shifting said bistable means between said rest and operating positions and for overriding said pneumatic means.

6. The pneumatically controlled hub of claim 2 wherein said bistable means includes:

reciprocating means actuated by said piston means;

means for transmitting expanding pressure against said resilient means from said inside said cylindrical shell means; and over-center means pivoted between said reciprocating means and said transmitting means.

7. The pneumatically controlled hub of claim 2 wherein said means for supplying pneumatic actuation to said valve means includes an auxiliary air chamber affixed to said cylindrical shell means and wherein said sensing means includes a plurality of apertures in said auxiliary air chamber and also includes closure means for sealing said aperture when said reel is positioned thereagainst.

8. The pneumatically controlled hub of claim 7 also including a drive shaft for rotating said cylindrical shell means and wherein aid means for supplying pneumatic actuation to said valve means includes a hollow portion of said shaft and apertures in said shaft interconnecting said hollow portion and said auxiliary air chamber.

9. The pneumatically controlled hub of claim 8 wherein said reciprocating means includes a sleeve slidably mounted on said drive shaft and wherein said drive shaft and wherein said piston means includes a lip seal slidably engaging the inner surface of said shell.

10. The pneumatically controlled hub of claim 9 wherein said cylindrical shell means includes transverse support means therein and wherein said sleeve is journalled in said transverse support means and wherein said transmitting means is at least a pair of shoes evenly spaced in the periphery of said cylindrical shell means and slidably retained between a wall of said main air chamber and said transverse support means.

* * * * *